US012626231B2

(12) United States Patent
Sadoghi Hamedani

(10) Patent No.: US 12,626,231 B2
(45) Date of Patent: May 12, 2026

(54) COLLABORATIVE TRANSACTION NOTARIZATION IN A BYZANTINE COMPUTING ENVIRONMENT

(71) Applicant: The Regents of the University of California, Oakland, CA (US)

(72) Inventor: Mohammad Sadoghi Hamedani, Davis, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 18/686,351

(22) PCT Filed: Sep. 14, 2022

(86) PCT No.: PCT/US2022/043416
§ 371 (c)(1),
(2) Date: Feb. 23, 2024

(87) PCT Pub. No.: WO2023/043762
PCT Pub. Date: Mar. 23, 2023

(65) Prior Publication Data
US 2024/0403840 A1 Dec. 5, 2024

Related U.S. Application Data

(60) Provisional application No. 63/245,699, filed on Sep. 17, 2021.

(51) Int. Cl.
*G06Q 20/02* (2012.01)
(52) U.S. Cl.
CPC .................................... *G06Q 20/02* (2013.01)
(58) Field of Classification Search
CPC ...................................................... G06Q 20/02
See application file for complete search history.

(56) References Cited

U.S. PATENT DOCUMENTS 11,424,938 B1 * 8/2022 Meehan ................ H04L 9/3263
2017/0288984 A1 10/2017 Nielsen et al.
(Continued)

FOREIGN PATENT DOCUMENTS

CN 110874351 * 10/2020 ............. G06Q 20/02
WO WO 2021119210 * 6/2021 ........... H04L 63/123
WO 2021135934 A1 8/2021

OTHER PUBLICATIONS

Santos, et al, "An Efficient Miner Strategy for Selecting Cryptocurrency Transactions," from 2019 IEEE International Conference on Blockchain, 2019 (Year: 2019).*
(Continued)

*Primary Examiner* — Mike Anderson
*Assistant Examiner* — Brandon M Duck
(74) *Attorney, Agent, or Firm* — MARSHALL, GERSTEIN & BORUN LLP

(57) ABSTRACT

A collaboration of miners cooperatively notarizes transactions to be added to a distributed ledger. A solution space is identified for notarizing the transactions, such as an integer space that may contain a nonce that, when hashed with the transactions or block, yields a hash value that satisfies specified criteria. The solution space is apportioned so that each miner has a discrete slice of the space in which to search for the nonce: different slices may be of equal or different sizes. All miners search their slices in parallel. If no miner announces success (e.g., within a specified time period), the solution space shifts so that each miner becomes responsible for a different slice. All miners may be rewarded when a solution is found, but a miner that failed to discover the nonce, despite searching a slice that contained it, is penalized and may not share in the reward.

27 Claims, 3 Drawing Sheets

(56)         References Cited

U.S. PATENT DOCUMENTS

| | | | |
|---|---|---|---|
| 2020/0286049 A1* | 9/2020 | Basu | G06Q 20/06 |
| 2021/0149772 A1* | 5/2021 | Zatespin | G06F 11/14 |
| 2021/0256007 A1 | 8/2021 | Wu et al. | |
| 2022/0327570 A1* | 10/2022 | Cooper | G06F 11/14 |

OTHER PUBLICATIONS

Mohammad Hossein Manshaei, "A Game-Theoretic Analysis of Shard-Based Permissionless Blockchains", In preprint: arxiv.org Sep. 24, 2018 [online] (retrieved on Jan. 4, 2023), Retrieved from the Internet< URL: https://arxiv.org/pdf/1809.07307 .pdf >, entire document.

* cited by examiner

COLLABORATIVE TRANSACTION NOTARIZATION IN A BYZANTINE COMPUTING ENVIRONMENT

RELATED APPLICATION(S)

This application claims priority to U.S. Provisional Patent Application 63/245,699, filed Sep. 17, 2021, which is incorporated herein by reference.

BACKGROUND

This disclosure relates to the field of distributed computing. More particularly, systems and methods are provided for collaboratively notarizing transactions in a distributed ledger within a Byzantine computing environment.

Distributed ledger data systems such as blockchains provide ordered histories of transactions in the form of linked blocks. Each block memorializes one or more transactions in a manner that makes the recorded transactions secure, immutable, and non-repudiable, and a transaction is added to a block only after being notarized. Blocks of transactions are cryptographically linked to form a chain, thereby making it is extremely difficult to replace an existing block or alter a transaction recorded within a block.

Currently, notarization of a transaction or a block of transactions is often conducted in a competitive manner using a protocol such as Proof-of-Work (PoW), wherein multiple participants simultaneously attempt to perform the notarization, but only one entity is successful. That participant may receive a monetary reward in the form of digital currency. The PoW protocol requires the participants to perform a great deal of computer processing and consume significant energy, most of which is wasted because only one participant is successful and is rewarded. Thus, performing notarization with a protocol such as PoW is very inefficient.

Further, distributed ledger systems are often implemented within a Byzantine computing environment. In this type of environment, a malicious participant may attempt to prevent a particular client entity from accessing the distributed data, prevent initiation or completion of some transactions (e.g., transactions of a particular client entity), obstruct the processing of a transaction, and/or cause inconsistency or disruption within the distributed data. A faulty but not necessarily malicious participant may also impede the processing of transactions. Data may be replicated to enhance system integrity and resiliency, but complexity may increase commensurately in order to keep all replicas current. In addition, full replication of a set of data may provide significant resiliency but will be difficult to scale as the amount of stored data grows.

Thus, there is a need for an efficient manner of notarizing great numbers of transactions while ensuring data integrity within a Byzantine environment. In particular, there is a need for notarizing transactions with high throughput yet without wasteful consumption of computing resources.

SUMMARY

In some embodiments, systems and methods are provided for collaboratively notarizing or settling transactions for addition to a distributed ledger. In these embodiments, a Power-of-Collaboration (PoC) protocol is provided in which entities (e.g., miners) that attempt to solve the notarization do so in a cooperative manner. All participants may be rewarded when a solution is found, although a participant that fails to cooperate may be penalized or punished. In a typical notarization problem, the goal is to identify a nonce that, when hashed with other information to be included in a new ledger block, yields a hash value having a specified number of leading zeros. Other types of compute-intensive problems may be employed in other notarization environments.

In these embodiments, the solution space in which the nonce is searched for is divided into N slices in an environment in which N miners collaborate. Slices may be of equal size or different sizes. Each miner attempts to solve the notarization using its slice and, if successful, broadcasts the result (e.g., the nonce, the completed block) to all miners to allow verification. Assuming its success is verified, the block is added to a distributed ledger to record the set of transactions, all miners share a reward (e.g., in digital currency), and the client or source of the set of transactions is notified. Also, if a default or specified source of transactions is not already specified, the successful miner becomes titular leader of the miners and has the option of selecting the next set of transactions.

Transactions may be received by a collaboration of miners directly from clients and/or from other sources. For example, a commitment protocol such as Practical Byzantine Fault Tolerance (PBFT) may be conducted on a transaction or set of transactions in order to obtain consensus as to the authenticity or validity of the transactions (and add the transaction(s)) to a first ledger), after which they may be forwarded to the PoC miners for notarization and minting (to add the transaction(s) to a second ledger). A participant in the commitment process may also act as a miner, and vice versa, depending on the computing power and resources of the entities. However, a participant in the commitment process must be able to prove its identity while a miner need not, but every miner must place some assets (e.g., digital currency) in reserve in order to participate in a mining collaboration.

Collaborative notarization proceeds in rounds, during which each miner searches an assigned slice or portion of the solution space for a solution to the problem. If no solution is found in the first round, the solution space shifts, meaning that in the following round each miner works in a different portion of the solution space. When the solution is found after one or more shifts, the miner or miners that failed to find it despite working in slices that contained the solution may be penalized to punish malicious or lazy behavior.

DETAILED DESCRIPTION

Figure 1:
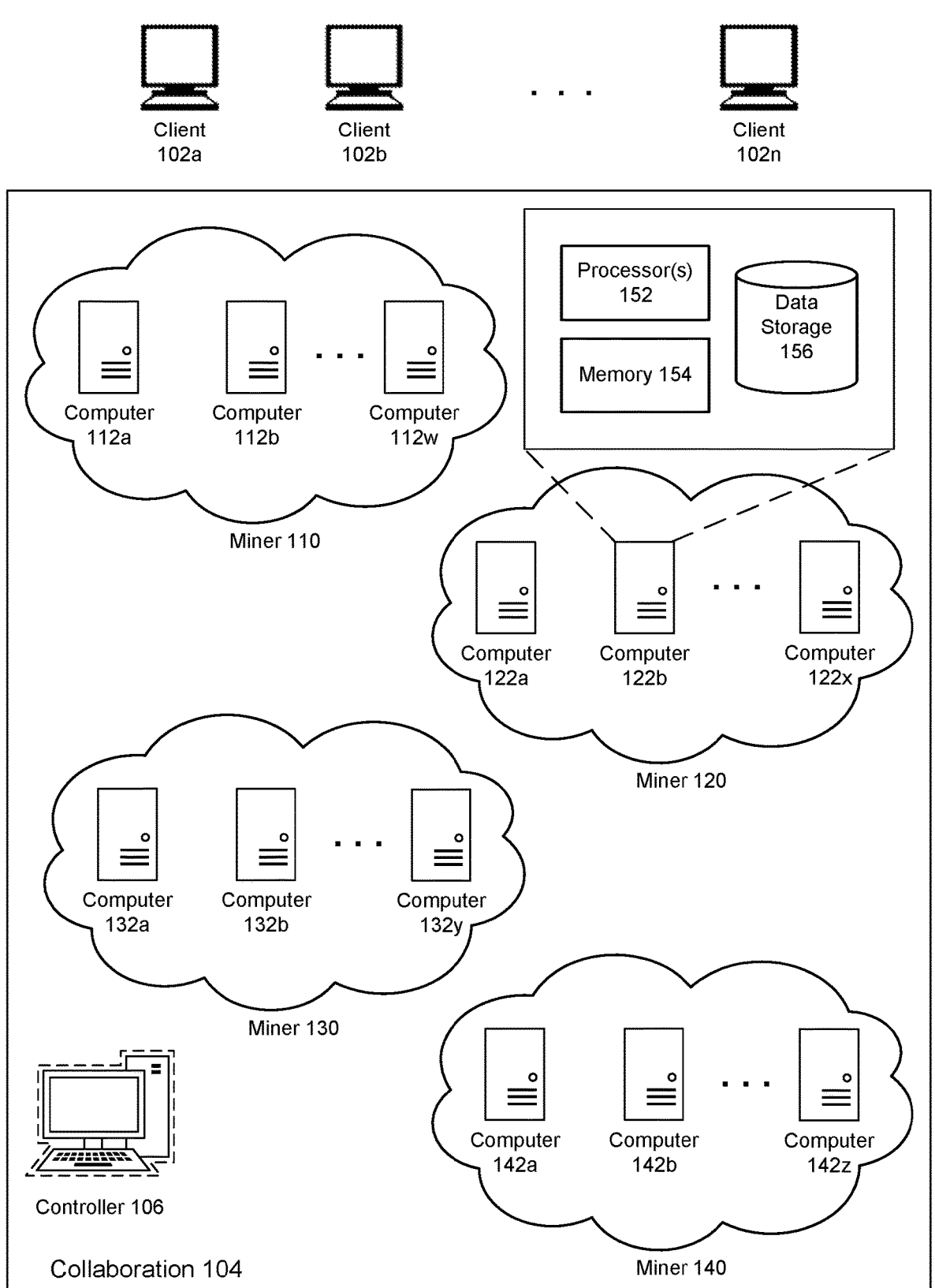
FIG. 1 is a block diagram depicting a computing environment in which transactions added to a distributed ledger are collaboratively notarized, in accordance with some embodiments.

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

In some embodiments, systems and methods are provided for collaboratively notarizing and adding transactions to a distributed ledger (e.g., a blockchain). In these embodiments, the entities that cooperate to notarize (or settle) a set of transaction are called miners, and a given collaboration may comprise any number of miners, each of which must maintain a reserve of digital currency (or other fungible assets) to participate.

Each miner participating in a collaboration receives the same set of transactions from a selected or predetermined source, for notarization, and has an assigned slice or portion of the overall solution space in which to search for a solution that results in notarization of the set of transactions. In some implementations, the goal is to find a nonce that, when hashed with the transactions or some representation of the set of transactions, yields a value that meets specified criteria (e.g., a 32-bit integer value that has at least X leading zeros).

Each miner is responsible for a discrete and nonoverlapping portion of the solution space, wherein the intersection of each miner's slice with any other slice yields the null set and the union of all slices yields the entire solution space. In some embodiments, all miners in a collaboration are assigned equal-sized slices. In other embodiments, the size or extent of a miner's slice is proportional to the initial deposit made by the miner in order to participate in the collaboration or its current reserves (e.g., its stake in the collaboration).

Upon receipt of a new set of transactions, and depending on the source of the set of transactions, the miners within a collaboration may first confirm that they have received the same data (e.g., by exchanging messages regarding the transactions or representations of such messages). They will then separately work (in parallel) to solve the notarization using their shares of the solution space. A successful miner broadcasts its solution to its collaborators for verification, after which the set of transactions is notarized and added to the collaboration's distributed ledger (or a separate ledger). The source of the set of transactions may be notified of the success, and all miners share a reward commensurate in size to their slices of the solution space.

However, if all miners fail to find a solution within a given round or predetermined period of time, a new round of collaboration begins in which the solution space is divided differently among the miners, such that each miner works in a different slice than it worked with during the previous round. In an implementation in which all miners have slices of equal size, they may simply shift the solution space so that each miner now works on the slice after (or before) its previous slice.

If no solution is found within some number of rounds, or after each miner has worked with the entire solution space, it may be determined that no solution exists, in which case the set of transactions (or the representation of the set of transactions) may be modified in some way in order to change the problem. The miners may then start collaborating on a solution to the revised problem.

However, if a solution is found after one or more shifts in the solution space have occurred, all miners are able to identify the miner or miners that failed to find the solution when they should have (i.e., when they were working in a portion of the solution space that contained the solution).

Those miners may be penalized by (a) not sharing in the reward and/or (b) paying a penalty out of their deposits or reserves, which may be distributed among the other miners.

In some embodiments, a set of transactions to be notarized by a collaboration of miners may be obtained or selected by the current leader of the collaboration (e.g., the miner that found the solution to the previous set of transactions). This leader may accept the set of transactions from a particular client, for example.

In some other embodiments, however, a collaboration has a relationship with a group of transaction authenticators that execute a commitment protocol to order and commit transactions submitted to them for addition to a ledger. In these embodiments, the authenticators apply the protocol (e.g., a Byzantine fault tolerant (or BFT) protocol) to commit the transactions and then, if successful, submit the set of transactions to the collaboration for notarization before the transactions are recorded in a new block added to a ledger maintained by the collaboration. In some implementations, the transactions are forwarded as a block accompanied by a certificate or other message that contains proof of the commitment (e.g., commitment messages signed by all or a quorum of the authenticators).

In these embodiments, an authenticator may or may not be permitted to also operate as a miner, and vice versa. It may be noted that identities of authenticators must be proven (e.g., via a trusted entity) in order to maintain the integrity of the authentication process, but miners need not reveal their identities, although they must maintain required reserves of digital currency (or other asset(s)).

A method of operation of a collaboration that accepts transactions from different clients and/or other sources may be termed a 'single-chain' model or embodiment because it primarily involves notarizing transactions for addition to a distributed ledger. In particular, commitment and settlement of the transactions are done in a single process using a single chain.

In contrast, a method of operation of a collaboration that receives authenticated transactions, along with a certificate or other guaranty of their validity, may be termed a 'dual-chain' model or embodiment because the collaboration's work complements the work of a group of authenticators. Here, commitment and settlement are accomplished via two separate processes, with one chain (or ledger) for commitment and a second chain (or ledger) for settlement.

In either model, collaborative notarization by cooperating miners may be enhanced by having each miner work on multiple slices (of the same problem or different problems) simultaneously. In particular, working on multiple slices of the same problem simultaneously may reduce or eliminate the need to shift the solution space in the event that no solution is found during a round of operation.

FIG. 1 is a block diagram depicting a computing environment in which transactions added to a distributed ledger are collaboratively notarized, according to some embodiments.

In these embodiments, miners 110, 120, 130 and 140 (and possibly other miners) form collaboration 104 for notarizing sets of transactions. A miner may also be termed a collaborator. Each miner comprises a number of computing devices for solving a notarization problem. Various types of computing devices (e.g., servers, workstations, desktops) may be used by a miner. Illustrative computer 122*b* comprises data storage 156, one or more processors 152, and memory 154, which may store instructions for execution by processor(s) 152.

Clients 102 (i.e., clients 102a-102n) generate transactions that are individually and or collectively submitted to collaboration 104 directly (in a single-chain embodiment) and/or via a collection of authenticators (in a dual-chain embodiment). After notarization, a set of transactions may be memorialized in a block added to a ledger that is distributed across some or all of miners 110-140 or a ledger that is located elsewhere (i.e., outside collaboration 104).

Collaboration 104 may optionally include coordinator 106 to assist in the operation and management of the collaboration. For example, coordinator 106 may retain digital currency deposited by miners 110-140 as their reserves, which help guarantee their honest participation in the collaboration. As described above, a collaborator found to be malicious or negligent (i.e., by not finding a solution that exists within its slice of the solution space) may forfeit a portion (or all) of its reserve and be excluded from the reward for solving that notarization problem. Coordinator 104 may also assist the collaboration by dividing a solution space among the miners, although the miners may do this themselves since the method of doing so will be deterministic.

It should be noted that, unlike some consensus protocols (e.g., Proof-of-Work or PoW), the plethora of computing resources engaged in collaborative notarization as part of a Proof-of-Collaboration implementation (e.g., within collaboration 104) are used in an efficient and cooperative manner. In particular, each set of resources (i.e., each miner) works a separate portion of the overall solution space, with no duplication of effort and, because the entire space may very well need to be searched to find the solution, there is no waste of resources. In contrast, traditional employment of the PoW protocol would cause the computing resources of miners 110-140 to be working the same solution space at the same time, thereby causing tremendous duplication of effort and waste of computing cycles and the energy used to power the resources.

In some embodiments, a collaboration is formed when some number of miners agree to its formation and deposit some amount of value as their reserves. Formation may be memorialized in an initial transaction collaboratively notarized by the miners and added to a ledger maintained by the collaboration. Unless and until the miners' respective deposits are modified, they each receive or are assigned a portion of the solution space for each notarization that is proportional to their portion of their reserves or their deposit. Thereafter, member miners may sell or otherwise transfer all or a portion of their membership, which transactions may also be notarized and added to their ledger.

It may be noted that, in some embodiments, a distributed ledger may be distributed among miners 110-140 so that blocks of transactions notarized by collaboration 104 can be immediately added to the ledger. In these embodiments, each miner may serve or act as a replica that stores all or a part of the ledger. Further, individual computing devices of a given miner may serve as separate shards that store a portion of the ledger that is maintained by the miner. Also, due to their robust resources, miners 110-140 may also act as authenticators and cooperate in the execution of a commitment protocol to commit transactions before notarizing them.

Miners participating in a collaboration have associated identifiers that are unique within the collaboration. They may therefore be ordered by these identifiers (e.g., from low to high or vice versa for numerical identifiers) as a logical ring.

Although not shown in FIG. 1, the illustrated computing environment includes communication links that couple each client to at least one miner, couple each miner's computing devices to each other, and couple at least one computing device of each miner to at least one computing device of other miners. Local and/or wide-area networks may be used to communicate between entities depicted in FIG. 1, including private networks (e.g., intranets) and/or public networks such as the Internet. Thus, during the processing of a transaction, a given computing device of a given miner may simultaneously and/or successively communicate with any number of other device and may also communicate with one or more clients.

Figure 2:
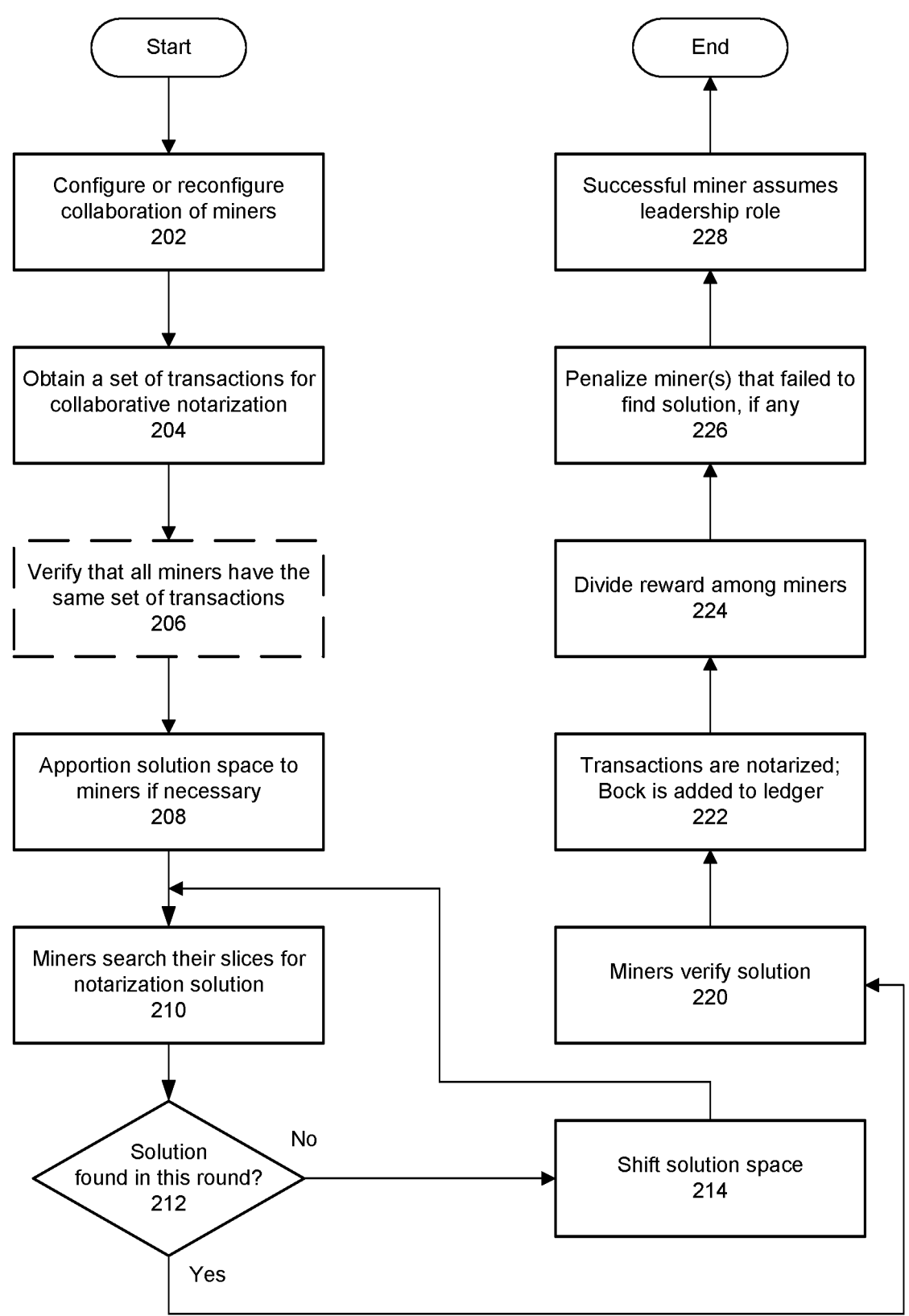
FIG. 2 is a flow chart illustrating a method of collaboratively notarizing a set of transactions in a single-chain model, in accordance with some embodiments.

FIG. 2 is a flow chart illustrating a method of collaboratively notarizing a set of transactions with a single-chain model, according to some embodiments. In one or more embodiments, one or more of the operations may be omitted, repeated, and/or performed in a different order. Accordingly, the specific arrangement of steps shown in FIG. 2 should not be construed as limiting the scope of the embodiments.

In operation 202, a collaboration of miners is configured or reconfigured. For example, each miner may deposit a required amount of digital currency to act as its reserve, slices of solution spaces may be assigned (e.g., proportional to miners' current reserves or initial deposit), an initial or current leader of the collaboration may be identified, the default difficulty of notarization problems may be specified (e.g., a magnitude of the target nonce (e.g., 32 bits), required number of leading zeros in the notarization solution), etc. Each configuration or reconfiguration of the collaboration, including modification of a miner's reserves, may be memorialized in the ledger maintained by the collaboration.

The total amount of value held in reserve (or deposited) by all miners is known to the miners, as well as the amount reserved by each miner. Therefore, each miner's percentage of the total reserves can be easily calculated and adopted as the size of its slice (i.e., its percentage) of the solution space. Slice sizes may be constant, and used for any number of collaborative notarizations, until there is a change in the miner population (e.g., a miner sells all or a portion of its stake in the collaboration), a change in a miner's reserves (e.g., because it has been penalized for lack of cooperation), or some other significant event.

In operation 204, a set of one or more transactions is received at the collaboration of miners. In some implementations, the source of the transactions (e.g., a client entity) sends identical copies of the set of transactions to all miners; in other implementations, the leader of the collaboration or another centralized entity (e.g., controller 106 of FIG. 1) receives the transactions and distributes them to all miners. In illustrative implementations of the single-chain model, the current leader of the collaboration chooses the source of the set of transactions if there are multiple possible sources.

In optional operation 206, the miners exchange messages regarding the received set of transactions (e.g., a hash, a digest) to ensure all miners will work on the same notarization problem. In the illustrated embodiments, messages between miners are authenticated. For example, the sender of a message may sign it with a private cryptographic key, without revealing its identity.

In operation 208, the solution space may be apportioned among the miners for the initial round of work on the current notarization problem, if not already apportioned. However, if miners' initial slices (i.e., the portion of the solution space worked by each miner during the first round of work on a new notarization problem) are static, then this operation may be omitted (e.g., until there is a change in the solution space or the configuration of the collaboration).

An illustrative solution space comprises all positive integer values of a given bit magnitude (e.g., 64, 128, 256). With static apportionment of initial slices, one miner (e.g., the one with the lowest or highest identifier) may always initially work a specified portion of the identified solution space (e.g., from 0 to $2^{20}$-1), the next miner would then initially work an adjacent portion (e.g., starting at $2^{20}$ or ending at $2^{65}$-1 in a 64-bit space), and so on.

In some implementations, however, the solution space for a new notarization problem is dynamically apportioned to miners for the first round of work on the problem, based on the sizes of their slices. In these implementations, the leader of the collaboration identifies the starting and/or ending points of its slice of the solution space for the first round of the current notarization. For example, if its slice encompasses X % (X>0) of the solution space and the solution space comprises all positive integer values of a given bit magnitude (e.g., 64, 128, 256), it may identify the starting value of its slice (e.g., zero, $2^{19}$, $2^{33}$) and/or the ending value. Assuming the collaborators are ring-ordered by unique identifiers, the next miner (i.e., the miner have the next highest (or lowest) identifier) knows the size of the leader's slice and accordingly identifies its initial portion of the solution space, adjacent to the leader's initial slice, and subsequent miners similarly know the sizes of the predecessors' slices and can therefore identify theirs as well. Thus, with dynamic apportionment, miners may initially work on different portions of the solution space for different notarization events.

In operation 210, each miner creates a block to contain the transactions and begins work in its current slice to attempt to solve the notarization (e.g., to find a nonce that, when hashed with the block, yields a hash value that satisfies the application criteria). In the illustrated embodiments, miners that finish searching their slices for a solution without success broadcast their failure to the other miners. Similarly, a miner that finds a solution will broadcast a message indicating its success and identifying the solution (e.g., a proposed new transaction block created using the discovered nonce). Because different miners may have slices of different sizes, and therefore will require different amounts of time to mine their slices, miners that failed to find a solution will pause work on the current notarization problem until they receive a message indicating success, or messages indicating failure from all or a majority of other miners, or until a timer configured to limit the duration of a round expires.

In operation 212, if no solution was found by any miner during the current round of work, the method continues at operation 214. Otherwise, the method advances to operation 220.

In operation 214, because no solution was found in the current round of operation, the miners shift their slices. In particular, each miner takes on a different portion of the solution space, thereby at least partially duplicating another miner's work. In an embodiment in which all miners' slices are of the same size, the slices may shift in the same direction each time a shift is required, such that each miner takes over the slice previously worked by the next (or previous) miner in ring-order.

In some embodiments in which miners' slices are of different sizes, despite shifting the solution space, each miner continues to work slices the same size as its initial slice. In these embodiments, shifting of the solution space may be envisioned as starting with the leader, although every miner can calculate how the shift proceeds (and identify the boundaries of its new slice) because every miner knows the size of every miner's slice and the boundaries of the slice the leader worked during the previous round.

In these embodiments, the shift involves the leader adopting a portion of the solution space adjacent to the portion it just mined, but of the same size. For example, if the solution space is an integer space, the lowest value in the leader's new slice is one greater than the highest value in its previous slice or the highest value in the new slice is one less than the lowest value in the previous slice. The new slice of the next miner in ring-order is defined adjacent to the leader's new slice, and so on. One advantage of this scheme is that when a solution is found, the reward is split normally, regardless of penalties that are assessed.

In some embodiments, a shift is not implemented by a miner until the miner receives a quorum or majority of messages from other miners that indicate that they failed to find a solution and that a shift is recommended. For example, a shift timer may be implemented by each miner, which is started when the miner begins working on a slice of the solution space and stopped when the miner discovers the solution or receives a message indicating that some other miner discovered the solution. Otherwise, if the timer expires, it initiates the slice-shifting process by broadcasting an appropriate message. If it receives this message from $2*f_M$ (or a majority of) other miners, it shifts its slice of the solution space. The timer may be configured to allow the miner(s) having the largest slice(s) sufficient time to complete their work.

In operation 216, the miners work in their new slices to try to find a solution to the notarization problem. After operation 216, the method returns to operation 212.

In operation 220, the other miners verify the correctness of the solution by validating the nonce. They may also broadcast messages that indicate that they agree with the solution or, contrarily, only send a response to the solution if they determine it is erroneous.

In operation 222, the solution is approved and added to a distributed ledger maintained by the collaboration. In particular, each miner appends the block received from the successful miner to its local copy of the single-chain ledger (which is replicated among all miners within the collaboration).

In operation 224, a reward is divided among all miners according to their shares. For example, a client or other entity that submits transactions for notarization may pay a fee for the service, and that fee is the reward that is distributed among the miners. In addition, a new token or denomination of digital currency may be minted each time a block is added to the collaboration's ledger, and the token may be divided among the miners.

However, if a particular notarization required more than one round of operation, miners that failed to find the verified solution when working in a portion of the solution space that contained the nonce may be omitted from the reward distribution. In some implementations, the portion(s) of the reward the negligent miner(s) would have received may be distributed among the other miners (according to their shares).

In operation 226, the miner or miners that failed to find the solution despite working on slices that contained the solution (if any) are penalized by forfeiting a portion of their reserves, which may be distributed among the other miners according to their shares. If a miner's reserves fall below a threshold, future rewards earned by the miner may be first used to replenish its reserves before being distributed to the miner. Eventually, a miner may be expelled from the collaboration because its reserves are exhausted or fall below a required minimum or because it too frequently fails to find the nonce when it should have, thereby wasting other miners' resources and energy.

In operation 228, the successful miner becomes leader of the collaboration and the method may end or may return to an earlier operation (e.g., operation 204 to accept a new set of transactions).

It may be possible no solution for a given notarization problem exists in the specified solution space that satisfies the specified criteria or difficulty. This may not be discovered or suspected until the solution space shifts a threshold number of times. In this situation, the miners may execute a protocol that modifies the problem (e.g., by adding data or a 'salt') to the block of transactions, thereby modifying the solution. After this occurs, the method may resume as if a new notarization problem has been received (e.g., at operation 208).

In the single-chain model described above in conjunction with FIG. 2, transactions may be received from multiple sources at the discretion of the current leader of the collaboration. One consequence is that a new set of transactions received for collaborative notarization may conflict with transactions already notarized and added to a ledger.

In contrast, implementation of a dual-chain model replaces the variable sourcing of transactions with a single vetted source. In particular, the first chain of the dual-chain model involves ordering and commitment of client transactions through a secure and resilient consensus protocol. Subsequently, the second chain involves collaborative notarization of the transactions and minting of a new block to be added to a ledger. Just as the first chain may involve aggregating or batching multiple individual transactions into a single committed first-chain block, the second chain may involve aggregating or batching multiple first-chain blocks into a single notarized second-chain block.

In a Byzantine computing environment in which a dual-chain model of collaborative notarization is implemented, the environment may be described as providing a system or service S={R, M, C}. R is a set of $n_R$ replicas (e.g., collections of computing devices) that cooperate to execute a Byzantine consensus protocol to order and commit transactions received from a set C of clients. In addition, each replica r stores a copy (or replica) of the distributed ledger to which notarized transactions are added. M is a set of $n_M$ miners collaboratively notarizing committed transactions (or sets of transactions).

Replicas must prove and verify their identities (e.g., by registering with a trusted agent or gateway), and use cryptographic features (e.g., MAC or message authentication codes, DS or digital signatures) as part of the consensus protocol. In contrast, miners participating in a collaboration may be anonymous and may be known by their public cryptographic keys in some implementations.

In a Byzantine environment, each replica and each miner has an associated identifier that is unique among all replicas and among all miners. At most $f_R$ replicas can be malicious or faulty (wherein $n_R \geq f_R+1$). Similarly, at most $f_M$ replicas can be malicious or faulty (wherein $n_M \geq f_M+1$).

Following the commitment of a set of transactions in the first chain by R, which may include addition of a corresponding block in a first ledger, the same transactions and/or others (e.g., one or more blocks of the first ledger) are delivered to M along with certificates from the member replicas of R. Each certificate sent by a replica r may include the client request corresponding to the set of transactions and copies of messages from other replicas in which they confirmed commitment of the transactions, including their authenticatable digital signatures. In some implementations, each replica sends a certificate to a corresponding miner. For example, the replica having the lowest replica identifier may send its certificate to the miner having the lowest miner identifier, and so on. When a miner receives a certificate from a replica, it broadcasts it to the other miners. Assuming there are no more than $f_R$ malicious/faulty replicas and no more than $f_M$ malicious/faulty miners, at least one miner will receive a valid certificate and make it available to all other miners.

The miners then notarize the received transactions to add them to a second chain, which includes addition of a corresponding block in a second ledger, possibly using the method illustrated in FIG. 2 and described above.

Figure 3:
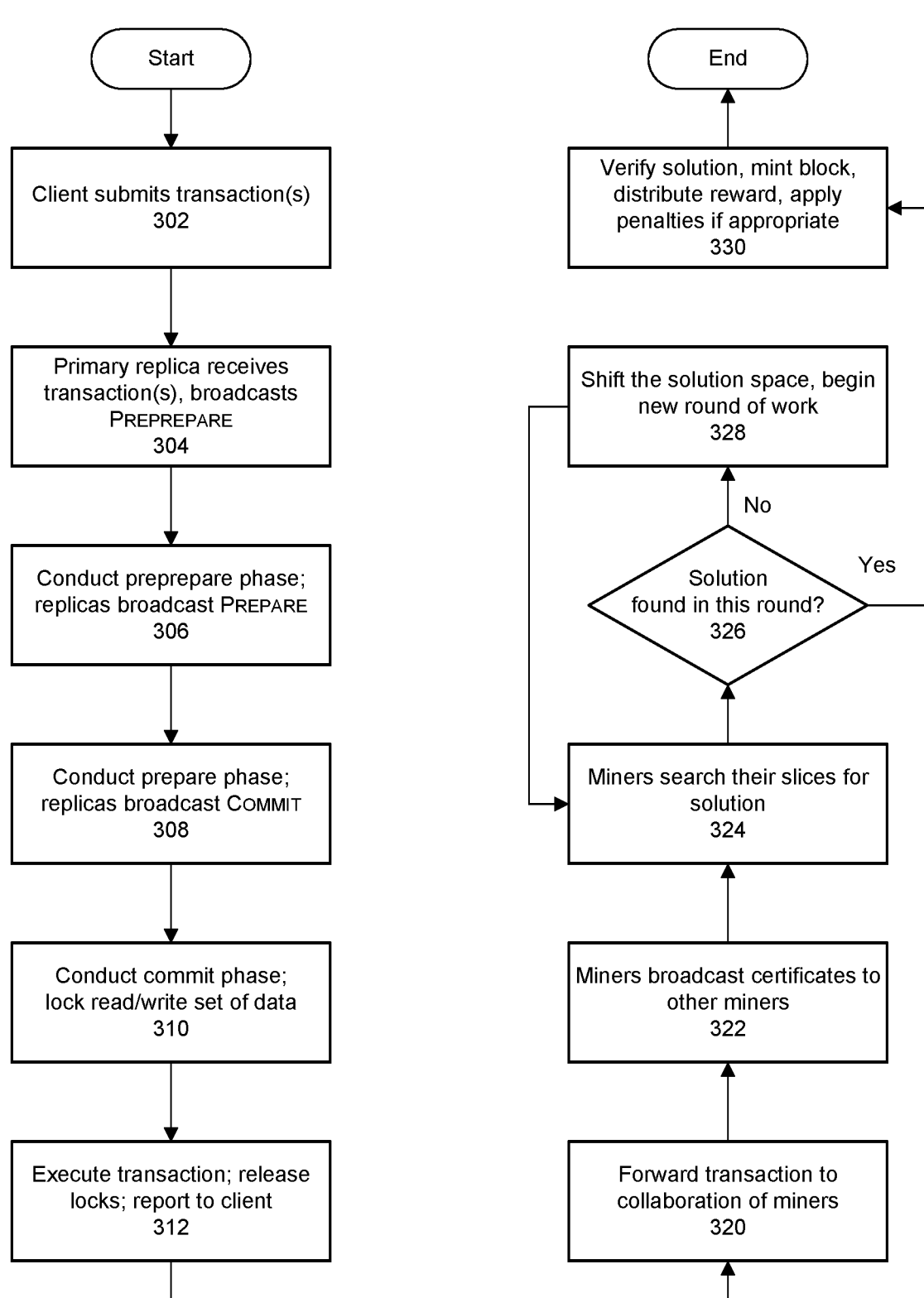
FIG. 3 is a flow chart illustrating a method of collaboratively notarizing a set of transactions in a dual-chain model, in accordance with some embodiments.

FIG. 3 is a flow chart illustrating a method of implementing a dual-chain model of collaborative notarization, according to some embodiments. In one or more embodiments, one or more of the operations may be omitted, repeated, and/or performed in a different order. Accordingly, the specific arrangement of steps shown in FIG. 3 should not be construed as limiting the scope of the embodiments.

In addition, the method illustrated in FIG. 3 reflects the use of PBFT as the transaction commitment protocol among set R of replicas. In different embodiments, different local consensus protocols may be used. Thus, the method of FIG. 3 may be modified to incorporate a different consensus protocol (other than PBFT) without exceeding the scope of the illustrated embodiments.

In operation 302, a client computing system submits a new transaction (or set of transactions) for ordering and commitment. Each transaction may involve payment (or other kind of transfer) of a digital currency or some other type of digital contract. The transaction(s) may be submitted to a primary replica if the primary is known to the client, or to any replica, which will forward it/them to the primary replica. However, the first recipient of the transaction examines the transaction to ensure it is well-formed (e.g., complete, formatted correctly, not corrupted) and further ensure, for monetary transactions, that the participants have sufficient value in their accounts.

In operation 304, the transaction is received at the primary replica. This replica assigns the transaction a linearly increasing sequence number (which may identify the primary replica), calculates a message digest (e.g., a hash of some or all transaction contents), and proposes the transaction to all other replicas. For example, it may broadcast a specific message dictated by the local consensus protocol (e.g., a PREPREPARE message for PBFT).

In operation 306, the replicas perform some initial checks of the transaction and/or the message in which the transaction was proposed. For example, a preprepare phase may be conducted within the shard, wherein each replica determines whether the PREPREPARE message received from the primary replica is well-formed and whether it has already received another transaction with the same sequence number from the same originator. If these checks pass, each replica broadcasts a pertinent message (e.g., a PREPARE message).

In operation 308, the replicas attempt to obtain consensus regarding the transaction. For example, a prepare phase may be conducted, wherein each replica determines whether it has received a sufficient number of identical and well-formed PREPARE messages. In particular, a replica must receive identical messages from more than $2*f_R+1$ other replicas. If this occurs, the replica broadcasts a corresponding message (e.g., a COMMIT message) to other replicas and marks the transaction 'prepared.'

In operation 310, each replica that receives well-formed and identical COMMIT messages from more than $2*f_R+1$ replicas determines whether it has marked as 'prepared' the same transaction having the same sequence number. If so, the replica locally locks the read/write set of data.

In operation 312, the replicas execute the transaction and release the data locks, and one or more replicas (e.g., the primary replica) report the status of the transaction(s) to the client.

In operation 320, each replica forwards the committed transaction(s) to a corresponding miner in a collaboration of miners (e.g., as a committed block), along with a certificate or message that provides evidence of the authenticity of the transaction(s), such as copies of signed COMMIT messages from some or all replicas. Alternatively, miners may pull the transactions (e.g., from the replicas' ledger).

In operation 322, each miner that received a certificate broadcasts it to all other miners.

In operation 324, each miner creates a block for the committed transactions and searches its slice of the solution space for a nonce that, when hashed with the block, yields a hash value that satisfies the applicable criteria. The created block includes a link to one or more previous blocks in the chain (e.g., the hash of the previous blocks) to ensure continued linkage of all notarized blocks.

In operation 326, if a solution is found, the successful miner broadcasts it (e.g., as a notarized block) and the method advances to operation 330.

Otherwise, in operation 328 the solution space is shifted so that each miner works a different portion of the solution space that may possibly overlap with the previously searched space (e.g., if miners are allocated slices of different sizes). The method then returns to operation 324.

In operation 330, the miners verify the solution, mint the block (e.g., add it to a ledger), distribute the reward, and apply penalties, if any. The method then ends.

Embodiments described herein satisfy essential requirements for a secure and trustworthy record of transactions. Those requirements include resiliency (the system can continue operation without interruption despite malicious behavior and/or failures by a minority of nodes), ordering (a distributed ledger stores transactions in an ordered manner), and integrity (existing transaction blocks in a ledger are virtually impossible to replace or alter without the support of a majority of the nodes).

An environment in which one or more embodiments described above are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory;

non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processes included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A method, comprising:

receiving a set of digital transactions at a collaboration of multiple miners, wherein each miner comprises one or more computer systems;

assigning to each miner a distinct slice of a solution space for discovering a solution for notarizing the set of digital transactions, each slice of the solution space being non-overlapping with the slices of the solution space assigned to other miners such that each miner is responsible for searching only its assigned slice of the solution space;

during each of one or more rounds:

at each miner, searching for a solution only in the assigned slice of the solution space by: generating candidate values within the assigned slice, hashing each candidate value with the set of digital transactions or a representation of the set of digital transactions to obtain a hash value, and determining whether the hash value meets predetermined criteria for notarizing the set of digital transactions;

when one of the miners discovers the solution, communicating a message identifying the solution to the other miners;

when one of the miners completes searching its assigned slice without discovering the solution, communicating a failure message to the other miners;

for each miner, determining whether the solution was discovered during the round based on receipt of the message identifying the solution from another miner or discovery of the solution locally, and, when the solution is not discovered during the round and after receipt of the failure message from at least a majority of the miners or expiration of a timer that limits a duration of the round, shifting the solution space by reassigning to each miner a different slice of the solution space for a next round; and when the solution is discovered and verified by the miners based on the message identifying the solution:

storing the set of digital transactions in a distributed ledger; and if the solution space was shifted at least once before the solution was discovered, penalizing one or more miners that failed to discover the solution while working in slices of the solution space that contained the solution.

2. The method of claim 1, wherein penalizing a miner comprises one or more of:

omitting the miner from a share of a reward resulting from discovery of the solution; and withdrawing from a monetary reserve associated with the miner.

3. The method of claim 1, further comprising, during each of the one or more rounds:

at each miner, searching for the solution only in the assigned slice of the solution space.

4. The method of claim 1, further comprising, when the solution is discovered:

distributing a reward among some or all of the multiple miners.

5. The method of claim 1, wherein receiving a set of digital transactions comprises:

receiving the set of digital transactions from a source selected by a current leader of the collaboration.

6. The method of claim 1, wherein receiving a set of digital transactions comprises:

receiving the set of digital transactions from a group of authenticators that executed a consensus protocol to commit the digital transactions; and receiving proof of commitment of the digital transactions.

7. The method of claim 1, wherein a slice of the solution space assigned to a given miner is proportional to the given miner's stake in the collaboration.

8. The method of claim 1, wherein all miners' assigned slices are equal in size.

9. The method of claim 1, wherein the candidate values comprise a nonce that, when hashed with the set of digital transactions or the representation of the set of digital transactions, yields the hash value meeting the predetermined criteria for notarizing the set of digital transactions.

10. A non-transitory computer-readable medium storing instructions that, when executed by a processor, cause the processor to perform a method comprising:

receiving a set of digital transactions at a collaboration of multiple miners, wherein each miner comprises one or more computer systems;

assigning to each miner a distinct slice of a solution space for discovering a solution for notarizing the set of digital transactions, each slice of the solution space being non-overlapping with the slices of the solution space assigned to other miners such that each miner is responsible for searching only its assigned slice of the solution space;

during each of one or more rounds:

at each miner, searching for a solution only in the assigned slice of the solution space by: generating candidate values within the assigned slice, hashing each candidate value with the set of digital transactions or a representation of the set of digital transactions to obtain a hash value, and determining whether the hash value meets predetermined criteria for notarizing the set of digital transactions;

when one of the miners discovers the solution, communicating a message identifying the solution to the other miners;

when one of the miners completes searching its assigned slice without discovering the solution, communicating a failure message to the other miners;

for each miner, determining whether the solution was discovered during the round based on receipt of the message identifying the solution from another miner or discovery of the solution locally, and, when the solution is not discovered during the round and after receipt of the failure message from at least a majority of the miners or expiration of a timer that limits a duration of the round, shifting the solution space by reassigning to each miner a different slice of the solution space for a next round; and when the solution is discovered and verified by the miners based on the message identifying the solution:

storing the set of digital transactions in a distributed ledger; and if the solution space was shifted at least once before the solution was discovered, penalizing one or more miners that failed to discover the solution while working in slices of the solution space that contained the solution.

11. The non-transitory computer-readable medium of claim 10, wherein penalizing a miner comprises one or more of:

omitting the miner from a share of a reward resulting from discovery of the solution; and withdrawing from a monetary reserve associated with the miner.

12. The non-transitory computer-readable medium of claim 10, the method further comprising, during each of the one or more rounds:

at each miner, searching for the solution only in the assigned slice of the solution space.

13. The non-transitory computer-readable medium of claim 10, the method further comprising, when the solution is discovered:

distributing a reward among some or all of the multiple miners.

14. The non-transitory computer-readable medium of claim 10, wherein receiving a set of digital transactions comprises:

receiving the set of digital transactions from a source selected by a current leader of the collaboration.

15. The non-transitory computer-readable medium of claim 10, wherein receiving a set of digital transactions comprises:

receiving the set of digital transactions from a group of authenticators that executed a consensus protocol to commit the digital transactions; and receiving proof of commitment of the digital transactions.

16. The non-transitory computer-readable medium of claim 10, wherein a slice of the solution space assigned to a given miner is proportional to the given miner's stake in the collaboration.

17. The non-transitory computer-readable medium of claim 10, wherein all miners' assigned slices are equal in size.

18. The non-transitory computer-readable medium of claim 10, wherein the candidate values comprise a nonce that, when hashed with the set of digital transactions or the representation of the set of digital transactions, yields the hash value meeting the predetermined criteria for notarizing the set of digital transactions.

19. A distributed computing system, comprising:

multiple collaborative miner systems, each miner system comprising:

one or more processors; and memory storing instructions that, when executed by the one or more processors, cause the miner system to:

receive a set of digital transactions;

adopt for each miner system a distinct slice of a solution space for discovering a solution for notarizing the set of digital transactions, each slice of the solution space being non-overlapping with the slices of the solution space assigned to other miner systems such that each miner system is responsible for searching only its assigned slice of the solution space;

during each of one or more rounds:

at each miner system, search for a solution only in the assigned slice of the solution space by: generating candidate values within the assigned slice, hash each candidate value with the set of digital transactions or a representation of the set of digital transactions to obtain a hash value, and determine whether the hash value meets predetermined criteria for notarizing the set of digital transactions;

when one of the miner systems discovers the solution, communicate a message identifying the solution to the other miner systems;

when one of the miner systems completes searching its assigned slice without discovering the solution, communicate a failure message to the other miner systems;

for each miner system, determine whether the solution was discovered during the round based on receipt of the message identifying the solution from another miner or discovery of the solution locally, and, when the solution is not discovered during the round and after receipt of the failure message from at least a majority of the miners or expiration of a timer that limits a duration of the round, shift the solution space by adopting for each miner system a different slice of the solution space for a next round; and when the solution is discovered and verified by the miner systems based on the message identifying the solution:

store the set of digital transactions in a distributed ledger; and if the solution space was shifted at least once before the solution was discovered, penalize one or more miner systems that failed to discover the solution while working in slices of the solution space that contained the solution.

20. The distributed computing system of claim 19, wherein penalizing a miner comprises one or more of:

omitting the miner from a share of a reward resulting from discovery of the solution; and withdrawing from a monetary reserve associated with the miner.

21. The distributed computing system of claim 19, wherein each miner system memory further stores instructions that, when executed by the one or more processors, cause the miner system to, during each of the one or more rounds:

at each miner, search for the solution only in the assigned slice of the solution space.

22. The distributed computing system of claim 19, wherein each miner system memory further stores instructions that, when executed by the one or more processors, cause the miner system to, when the solution is discovered:

distribute a reward among some or all of the multiple miners.

23. The distributed computing system of claim 19, wherein receiving a set of digital transactions comprises:

receiving the set of digital transactions from a source selected by a current leader of the collaboration.

24. The distributed computing system of claim 19, wherein receiving a set of digital transactions comprises:

receiving the set of digital transactions from a group of authenticators that executed a consensus protocol to commit the digital transactions; and receiving proof of commitment of the digital transactions.

25. The distributed computing system of claim 19, wherein a slice of the solution space assigned to a given miner is proportional to the given miner's stake in the collaboration.

26. The distributed computing system of claim 19, wherein all miners' assigned slices are equal in size.

27. The distributed computing system of claim 19, wherein the candidate values comprise a nonce that, when hashed with the set of digital transactions or the representation of the set of digital transactions, yields the hash value meeting the predetermined criteria for notarizing the set of digital transactions.

* * * * *